United States Patent [19]
Bohn

[11] 3,883,981
[45] May 20, 1975

[54] HOLDER FOR FISHLINE RELEASE BUTTON
[76] Inventor: August C. Bohn, 1423 Walnut N.E., Grand Rapids, Mich. 49503
[22] Filed: July 18, 1974
[21] Appl. No.: 489,809

[52] U.S. Cl. .............................................. 43/43.12
[51] Int. Cl............................................ A01k 91/00
[58] Field of Search............ 43/43.12, 44.87, 44.88, 43/42.74, 25

[56] References Cited
UNITED STATES PATENTS
3,778,918  12/1973  Emory ................................ 43/43.12

Primary Examiner—Louis G. Mancene
Assistant Examiner—Peter K. Skiff
Attorney, Agent, or Firm—Glenn B. Morse

[57] ABSTRACT

The "button" component of a conventional downrigger fishline release is held temporarily in a retainer secured to the tip of the fishing pole to permit trailing distance to be paid out prior to carrying the line down to trolling depth with the down weight.

8 Claims, 11 Drawing Figures

PATENTED MAY 20 1975 3,883,981

HOLDER FOR FISHLINE RELEASE BUTTON

BACKGROUND OF THE INVENTION

Deep-water trolling in the Great Lakes and in many salt water areas has evolved a standard procedure for positioning the lure at the desired depth determined by temperature, oxygen content, or by instrumentation giving a direct visual readout of the location and position of fish. The line is carried to the trolling depth by a weight suspended on its own line or cable, and the fishline is releaseably secured to the weight so that the lure trails directly behind at a selected distance. One form of a standard release device includes a plastic "button" of a generally annular configuration, and having a peripheral groove engaged by a wire clip having the general configuration of a small modified hairpin. The loop end of this clip is normally secured with some form of snap hook directly to the trolling weight, and the tines of the clip are bent into a sort of bow-legged configuration having an arcuate conformity to the curvature of the release button at the base of the peripheral groove. The result of this interengagement, together with the resilience of the clip, is to permit the button carrying the fishline to be pulled out by the force of the strike of a fish on the lure. Once pulled free, the line is under the full control of the fishpole. This general type of arrangement appears in the following patents, among others:

| 2,735,212 | Baum | 1956 |
| 2,749,649 | Fitzsimmons | 1956 |
| 2,858,647 | Stark | 1958 |
| 3,738,047 | Tozer | 1973 |

The judgment of fisherman will often vary as to the proper trailing distance at which the lure should be positioned behind the trolling weight. Trolling conditions, together with the characteristics of the lure itself, will influence this distance. The manner of establishing the desired trailing distance involves the pay-out of the desired length of line behind the boat while the lure is at or near the surface, and prior to the lowering of the trolling weight. Standard procedure here is for the fisherman to hold the little release "button" in his fingers as the trailing distance line is paid out through it. The button, of course, surrounds the line at a point beyond the tip of the rod, and stays with the line at all times. After the correct trailing distance has been paid out, the fisherman makes a small loop in the line entrapping the button, and rotates the button to produce several turns of twist in this loop. The button is then slipped into the release clip associated with the down weight, and the assembly is then lowered to the desired trolling depth.

The necessity for handling the reel, line, and the release button at the same time produces a sort of "three-handed" procedure, requiring a very considerable degree of dexterity. Under adverse weather conditions, the procedure is obviously further complicated. The present invention is directed at eliminating the need to manually handle the release button during the pay-out of the fishline to establish trailing distance.

SUMMARY OF THE INVENTION

The release button is detachably held in a retainer secured to the tip of the fishing pole in a position such that the button is in close alignment with the end ferrule of the fishpole. The retainer has a portion in the form of a clip or clamp engaging the tip of the fishing rod slightly back of the end ferrule. An overarm extends from this portion to a position beyond the end ferrule, where a spring retainer of the type associated with a downrigger release temporarily holds the release button in alignment and close proximity with the end ferrule of the fishing rod. In the preferred form of the invention, the clip is received in a peripheral groove at the end of the overarm, producing a rotatability of the clip around the axis of the overarm (and parallel to the axis of the tip of the rod). The end of the overarm is provided with a cam configuration, and the retainer clip causes the release button to bear resiliently against the cam surface. The configuration of the cam surface is such as to establish a tendency for the button to maintain a position of alignment with the end ferrule of the rod, and rotation of the clip and button out of this position has a slight tendency to push the button in a direction out of the grasp of the clip, thus facilitating both removal and insertion of the button.

DESCRIPTION OF THE PREFERRED EMBODIMENT

Figure 1:
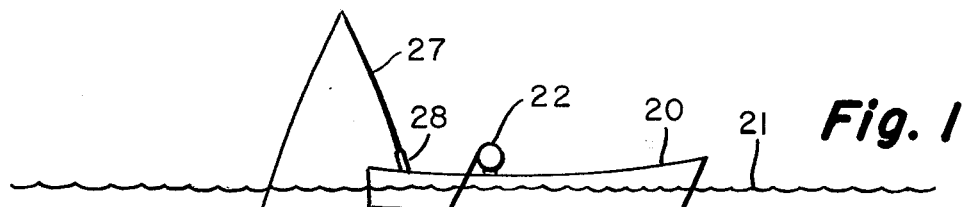
FIG. 1 is a schematic view showing a small fishing boat with a conventional downrigger installation under trolling conditions.

The boat 20 at the surface 21 of the water is equipped with a downrigger reel 22 carrying the cable 23 suspending the trolling weight 24. The release assembly generally indicated at 25 holds the fishline 26 extending to the fishpole 27, which may be temporarily held in the illustrated position by a socket 28 mounted in the boat. The line 26 extends through the release assembly to a predetermined distance back to the lure 29.

Figure 2:
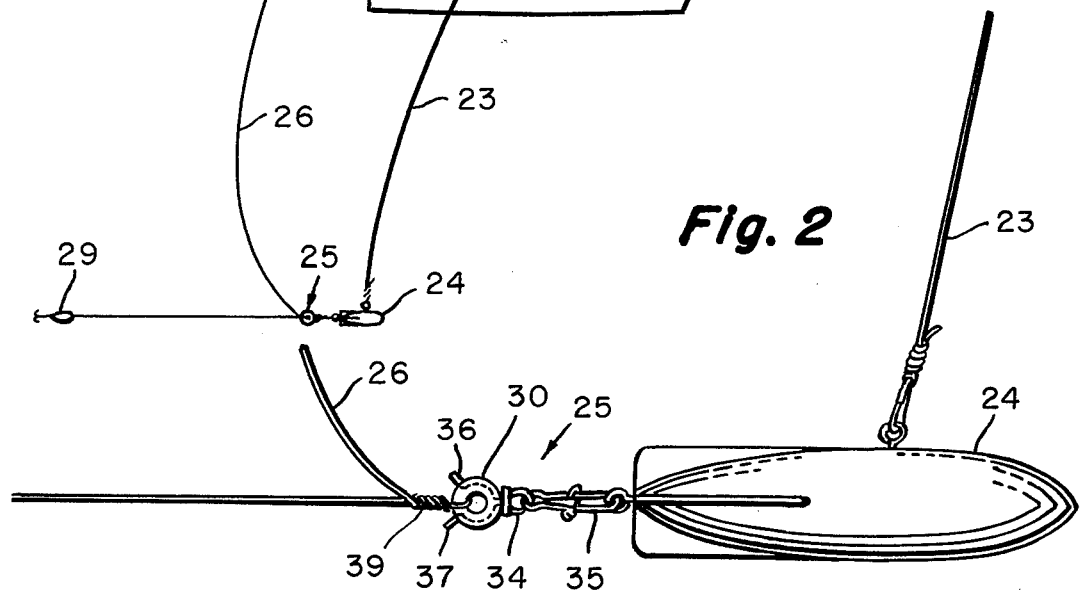
FIG. 2 is an enlarged view showing the assembly associated with the trolling weight.
Figure 8:
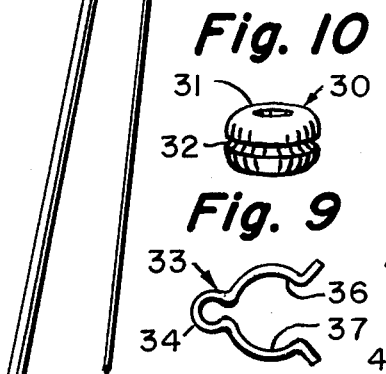
FIG. 8 is a plan view of the retaining clip.
Figures 9, 11:
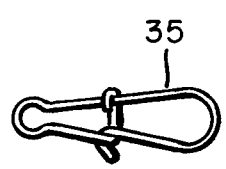
FIG. 9 is a perspective view of a conventional release button.
FIG. 11 is a view of a conventional "safety pin" snap hook.
Figure 10:
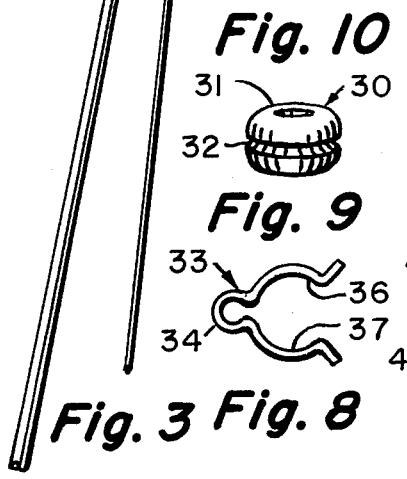
FIG. 10 is a plan view of a clip as shown in FIG. 8, with the addition of a restraining ring.
Figure 6:
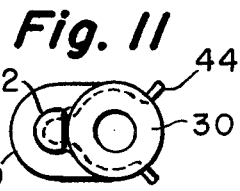
FIG. 6 is an end view of the device in the position shown in FIG. 4.

The conventional release assembly shown in FIG. 2 includes the annular button 30 having the central opening 31 traversed by the fishline 26, and also having a peripheral groove 32 receiving the spring clip 33 shown in FIGS. 8 and 10. This cip has an eye 34 normally engaging the snap hook 35 shown in FIG. 11; and also has the arcuate sections 36 and 37, which are the portions of the clip in direct bearing engagement with the groove 32 of the button. The resilience of the clip 33 may be reinforced somewhat by the addition of the restraining ring 38 shown in FIG. 10, which is also conventional.

When the button 30 is installed as shown in FIG. 2, the line is twisted as indicated at 39 to prevent the fishline from slipping on through the button 30. Since the release assembly is non-rotative, the twist 39 is maintained until the button 30 is pulled free of the clip 33 by the fish. Once free, the twist 39 immediately disappears, and the button 30 then slides on down to a position close to the lure.

Figure 3:
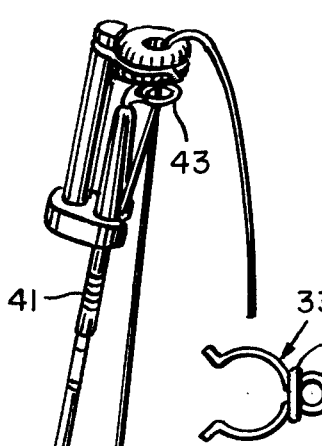
FIG. 3 is a perspective view of the tip section of a fish rod with the present invention installed.
Figure 4:
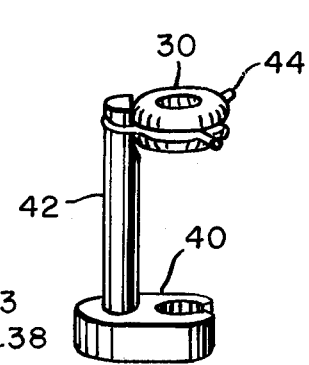
FIG. 4 is a perspective view of the holding device apart from the fishing rod, with the device in the position shown in FIG. 3.
Figure 5:
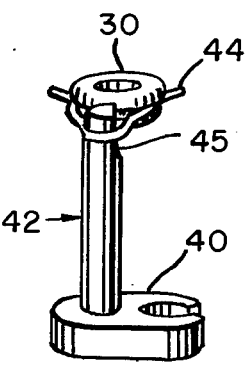
FIG. 5 is a view of the same device illustrated in FIG. 4, rotated out of operating position for installation and removal of the button.
Figure 7:
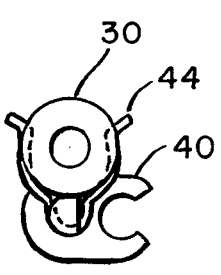
FIG. 7 is an end view of the device in the position shown in FIG. 5.

Prior to placement of the button 30 in the grasp of the clip 33, it is held by the device shown in FIG. 3 as the trailing distance is paid out behind the boat prior to the lowering of the trolling weight. This device includes the clamp 40 engaging the tip 41 of the fishing rod, and the over-arm 42 extending to a position beyond the end ferrule 43 of the rod. The clip 44 is preferably identical to the clip 33. The eye of the clip 44 is received within a peripheral groove in the outer end of the overarm 42 so that the clip may be rotated about the axis of the overarm. The combination of the generally cylindrical periphery of the overarm 42, together with the flat surface 45 produces a cam action as a result of the tendency of the button 30 to remain concentric with the arcuate portions 36 and 37 of the clip. The resilient tendency of the wire clip 44 to hold the button 30 against the overarm 42 will cause the flat 45 to establish a position of alignment of the button 30 with the end ferrule as shown in FIG. 3. Rotation of the assembly of the clip 44 and the button 30 into the position shown in FIGS. 5 and 7 will induce a slight movement of the button radially outward toward disengagement of the button from the clip, thus facilitating the installation and removal of the button. Rotation to this position also gives much better access to the button.

I claim:

1. In combination with a fishing rod and a fishing line associated with said rod, and with a ring normally traversed by said line, a ring holder comprising:
   a clamping member adapted to engage said rod adjacent the tip thereof;
   an arm normally extending from said clamping member parallel to said rod and beyond said tip; and
   clip means adapted to releaseably secure said ring to said arm.

2. A combination as defined in claim 1, wherein said arm has a peripheral groove receiving said clip means.

3. A combination as defined in claim 1, wherein said arm has a cam surface disposed to bear on said ring to induce displacement of said ring on rotation of said ring and clip means about the axis of said arm, said clip means having a configuration and a resilience tending to maintain a position of said ring against said cam surface.

4. In combination with a fishing rod having a tip ferrule and a fishing line associated with said rod, and with a ring normally traversed by said line, said ring having a peripheral groove, a ring holder comprising:
   a clamping member adapted to engage said rod adjacent the tip thereof;
   an arm normally extending from said clamping member parallel to said rod and beyond said tip ferrule; and
   clip means adapted to releaseably secure said ring to said arm.

5. A combination as defined in claim 4, wherein said arm has a peripheral groove receiving said clip means.

6. A combination as defined in claim 4, wherein said arm has a cam surface disposed to bear on said ring to induce displacement of said ring on rotation of said ring and clip means about the axis of said arm, said clip means having a configuration and a resilience tending to maintain a position of said ring against said cam surface.

7. A combination as defined in claim 6, wherein said cam surface is adapted to align said ring and clip with said tip ferrule.

8. A combination as defined in claim 6, wherein said clip means has a forked configuration, and said rotation induces movement of said ring toward disengagement from said clip means as said ring moves out of alignment with said ferrule.

* * * * *